United States Patent [19]
Armbruster et al.

[11] Patent Number: 5,956,639
[45] Date of Patent: Sep. 21, 1999

[54] METHOD AND APPARATUS FOR REGISTERING MOBILE USER GROUPS WITH A RADIO TELECOMMUNICATION SYSTEM

[75] Inventors: Peter Joseph Armbruster, Tempe; Kenneth Lee Sowles; James William Bishop, Jr., both of Chandler, all of Ariz.

[73] Assignee: Motorola, Inc., Schaumburg, Ill.

[21] Appl. No.: 08/606,952

[22] Filed: Feb. 26, 1996

[51] Int. Cl.[6] .................................................. H04B 7/185
[52] U.S. Cl. .......................... 455/431; 455/435; 455/11.1
[58] Field of Search .................................. 455/435, 427, 455/428, 430, 432, 11.1, 12.1, 13.1, 13.2, 431; 370/261

[56] References Cited

U.S. PATENT DOCUMENTS

| | | | |
|---|---|---|---|
| 5,274,837 | 12/1993 | Childress et al. | 455/510 X |
| 5,404,570 | 4/1995 | Charas et al. | 455/446 X |
| 5,428,665 | 6/1995 | Lantto | 455/433 X |
| 5,559,865 | 9/1996 | Gilhousen | 455/435 X |
| 5,663,953 | 9/1997 | Maekawa | 370/261 |

*Primary Examiner*—Edward F. Urban
*Assistant Examiner*—Philip J. Sobutka
*Attorney, Agent, or Firm*—Sherry J. Whitney

[57] ABSTRACT

A method and apparatus for a communication system (100) to register groups of co-located users in a mobile vehicle (110) involves collecting (200) registration information for multiple users by a Vehicle Communications Control Unit (500) (VCCU) on board the mobile vehicle (110), creating (202) at least one group registration request message by the VCCU (500), and sending the at least one group registration request message to an Earth Terminal (102) (ET) of the communication system (100). After the communication system (100) registers each user whose registration information is contained within the at least one group registration request message, the ET (102) sends (312) at least one group registration response message to the VCCU (500), where the message includes information describing whether each registration attempt was successful. The VCCU (500) can then inform (210) each user as to the status of the registration attempt.

20 Claims, 4 Drawing Sheets

METHOD AND APPARATUS FOR REGISTERING MOBILE USER GROUPS WITH A RADIO TELECOMMUNICATION SYSTEM

FIELD OF THE INVENTION

This invention relates generally to radio telecommunications and, more particularly, to registering groups of communication system users who are co-located in a mobile vehicle.

BACKGROUND OF THE INVENTION

A communication unit (e.g., a cellular telephone or pager) of a mobile telecommunication system occasionally performs a registration procedure which informs the system of the communication unit's current location. Location registration is required to enable the system to contact the communication unit when an incoming communication attempt is destined for the communication unit. Location registration information is also useful for billing purposes. As the communication unit moves, it must occasionally re-register with the system.

Each registration process involves an exchange of messages between the communication unit and the system. These registration messages generate communication traffic which is non-revenue bearing in nature. The non-revenue bearing traffic volume is compounded when groups of communication units which are co-located on a mobile vehicle (e.g., communication units on-board an airplane) must individually register with the system. Prior-art mobile group registration procedures require each communication unit to register individually with the system. This individualized procedure results in a large amount of non-revenue bearing traffic.

What is needed is a method and apparatus for simple registration of co-located mobile user groups. Further needed is a method and apparatus to reduce the amount of non-revenue bearing traffic during registration of co-located mobile user groups.

DETAILED DESCRIPTION OF THE DRAWINGS

The method and apparatus of the present invention enable simple registration of co-located mobile user groups and reduces the amount of non-revenue bearing traffic during the group registration. The method involves collecting registration information from multiple system users who are co-located on a mobile vehicle and sending the collected registration information to the system using a reduced number of messages than the number that would be required for individual registration of each system user.

Figure 1:
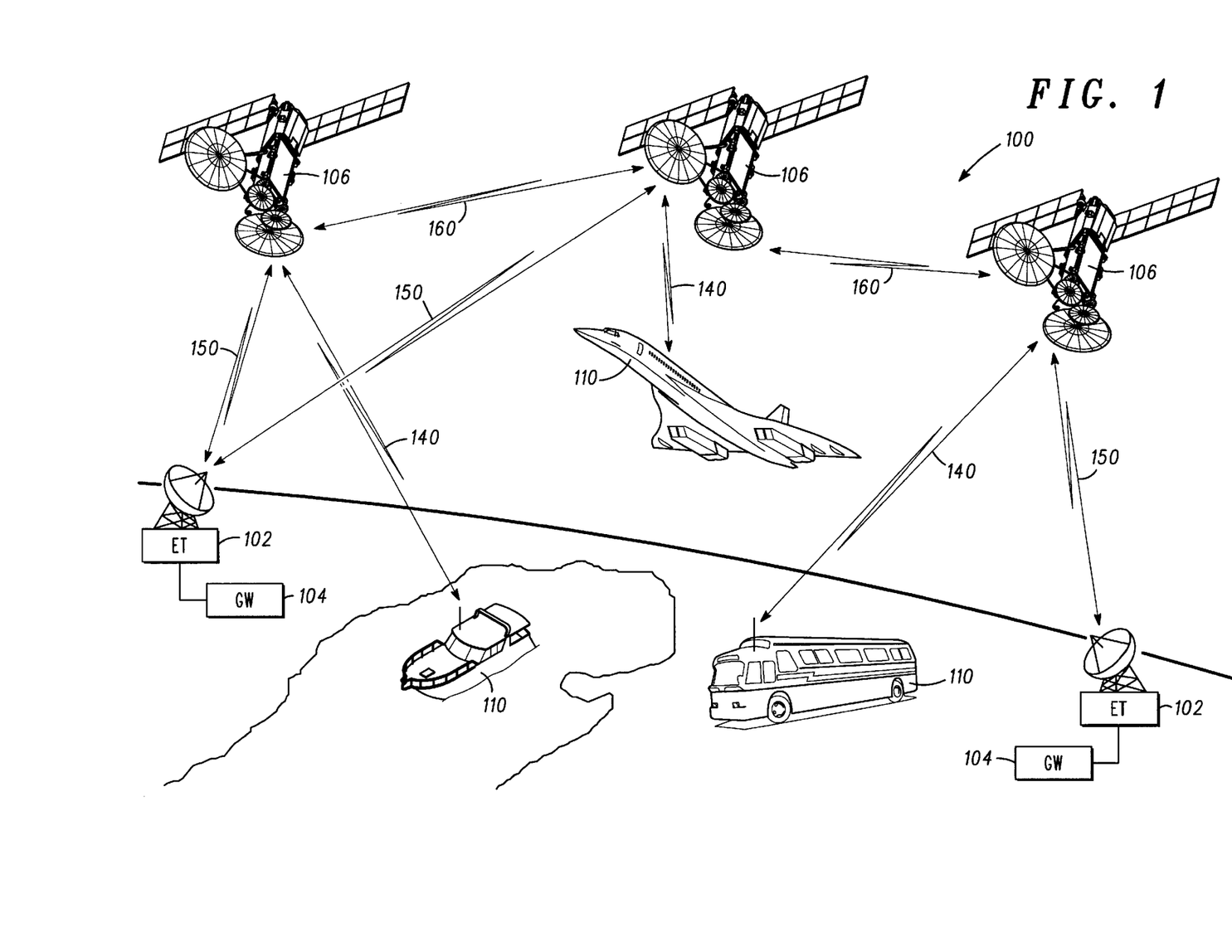
FIG. 1 illustrates a radio telecommunication system in accordance with a preferred embodiment of the present invention.

FIG. 1 illustrates radio telecommunication system 100 in accordance with a preferred embodiment of the present invention. System 100 includes at least one Earth Terminal 102 (ET), which desirably includes a ground-based antenna that communicates either directly or indirectly with one or more mobile vehicles 110. Mobile vehicles 110 are generally of a type designed to transport groups of co-located persons. For example, mobile vehicles 110 could include busses, ships, monorails, and airplanes, although this list is not exhaustive.

In a preferred embodiment, system 100 includes one or more satellites 106, although satellites 106 are not necessary to practice the invention. Vehicles 110 communicate with satellites 106 over links 140 and ETs 102 communicate with satellites 106 over links 150. Satellites 106 are capable of communicating with each other over cross-links 160 and can relay messages received from vehicles 110 and ETs 102 to their desired destination (e.g., another vehicle 110 or ET 102).

In an alternate embodiment, system 100 includes satellites 106 which do not communicate directly with vehicles 110, but instead are used to relay messages between ETs 102 using cross-links 160, bent-pipe links (not shown), or a combination thereof. In still another embodiment, system 100 does not include satellites 106 and vehicles 110 communicate directly with ETs 102. The particular apparatus and types of communication links used to provide communication paths between vehicles 110 and ETs 102 can be modified from the embodiments described without departing from the scope of the present invention.

ETs 102 are connected to Gateways 104 (GW) which provide communications capabilities with other communication networks (not shown), such as Public Switched Telephone Networks (PSTN) or ground-based cellular communication systems, for example. In a preferred embodiment, GW 104 occasionally receives and processes registration information for users of system 100. For system users who are located on-board mobile vehicle 110, GW 104 receives users' registration information from communication equipment (not shown) co-located with mobile vehicle 110. As will be described further in conjunction with FIGS. 2–6, in a preferred embodiment, the registration information for multiple co-located users is collected at vehicle 110 by a vehicle communication control unit and sent to GW 104 as one or more combined messages, rather than sending registration information individually as was done in the prior art.

Figure 2:
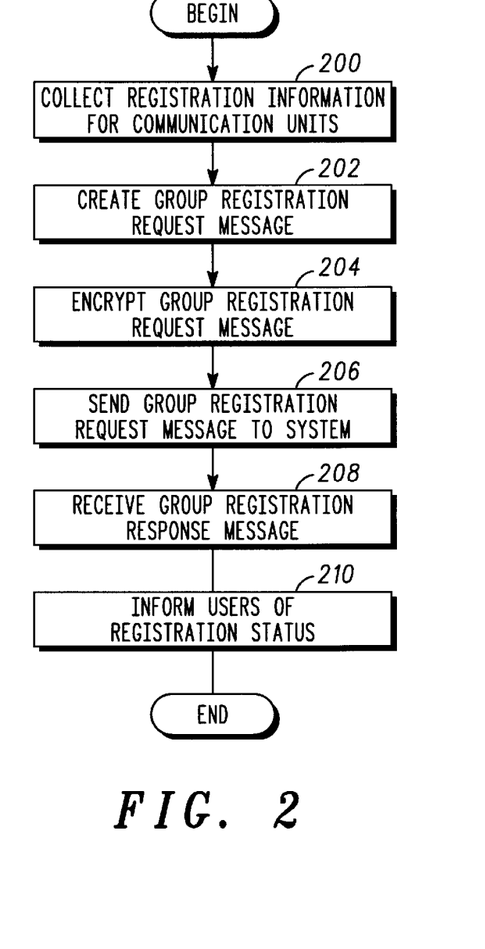
FIG. 2 illustrates a flowchart of a method for collecting and sending registration information for a group of co-located mobile communication units to a communication system in accordance with a preferred embodiment of the present invention.

FIG. 2 illustrates a flowchart of a method for collecting and sending registration information for a group of co-located communication units to a communication system in accordance with a preferred embodiment of the present invention. The method is performed by a vehicle communication control unit (VCCU) which is co-located with the mobile vehicle and which is in communication contact with the communication units. The communication units also are co-located with the vehicle. The method begins by the VCCU performing the step 200 of collecting registration information from users of a group of the communication units. These users typically are passengers of the mobile vehicle.

The communication units can be, for example, telephone handsets (e.g., airplane seatback handsets), faxes, computers, or data processing units which are coupled to the VCCU using hard wired, optical, or RF links. The VCCU can collect the registration information, for example, by prompting each potential communication unit user to enter his or her registration information. Each potential user who wishes to register with the communication system can then enter their registration information. Registration information can be entered, for example, by entering digits into a keypad or by inserting a magnetically coded card or the user device may determine the necessity to register autonomously from the user. The VCCU collects the registration information.

In a preferred embodiment, in step 202, the VCCU then creates a group registration request message which incorporates the collected registration information from the multiple users. In alternate embodiments, the VCCU could incorporate the collected registration information into multiple messages, for example, if messaging protocols only allow messages of a certain length.

In a preferred embodiment, the group registration request message also includes location information which can be derived by the VCCU (e.g., using geolocation). Location information is necessary for the system to know where to contact the user and also for billing purposes. In an alternate embodiment, the location information can be derived by the communication system, for example, using Doppler and time delay measurements.

Next, in a preferred embodiment, the group registration request message is encrypted in step 204, although encryption is not necessary to the present invention. Encryption is useful to protect the registration information from acquisition by parties who could use the information for illegitimate purposes. In one alternate embodiment, the group registration request message is not encrypted. In another alternate embodiment, the registration information for each user is separately encrypted before creating the group registration request message.

The VCCU then sends the unencrypted or encrypted group registration request message, in step 206, to the communication system. Typically the VCCU must send the message over an RF link between the VCCU and the communication system. However, a vehicle which can communicate over hard-wired links (e.g., a monorail car) could send the message over a hard-wired link.

After the system processes the group registration request message, the VCCU receives a group registration response message from the system in step 208. The group registration response message indicates which users the communication system has successfully registered and/or which users the communication system has not successfully registered. In step 210, the VCCU then informs each communication unit user of his or her registration status (i.e., as either successful or unsuccessful). In alternate embodiments, the VCCU could only inform those users who have not been successfully registered, or could only inform those users who have been successfully registered. In another alternate embodiment, the VCCU could inform a user of his or her registration status when the user attempts to establish a communication link with a non-passenger. The method then ends.

Figure 3:
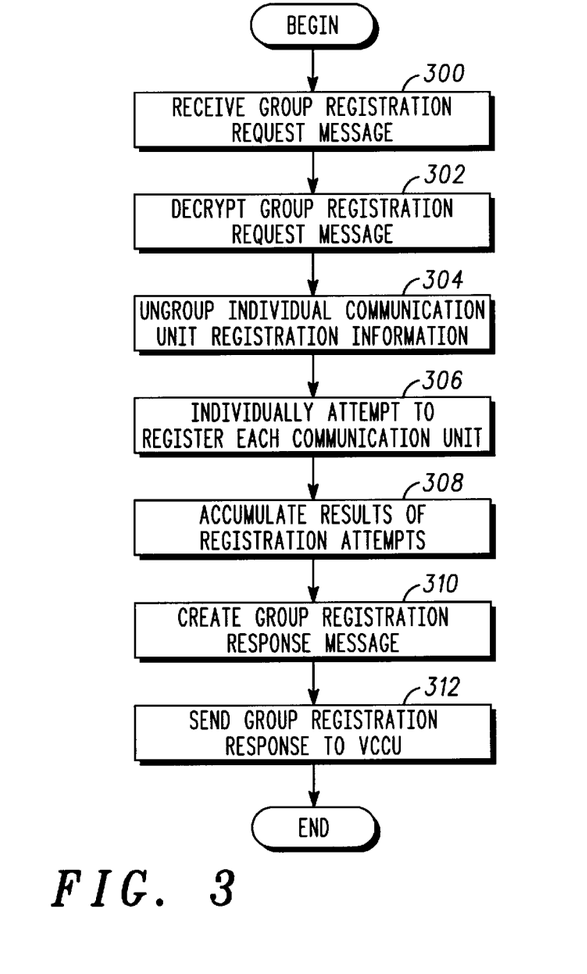
FIG. 3 illustrates a flowchart of a system registration method for a group of co-located mobile communication units in accordance with a preferred embodiment of the present invention.

FIG. 3 illustrates a flowchart of a system registration method for a group of co-located mobile communication units in accordance with a preferred embodiment of the present invention. The method is performed by a "registering ET" (e.g., ET 102, FIG. 1). The method begins at step 300 when the registering ET receives one or more group registration request messages which were sent by a VCCU. In a preferred embodiment, where the group registration request message is received in an encrypted form, the registering ET decrypts the group registration request message in step 302. In step 304, the registering ET ungroups the group registration request message to obtain individual registration information for each communication unit of the group.

The registering ET then attempts to register each communication unit of the group individually in step 306. An individual registration attempt involves sending the individual registration information to the home GW (e.g., GW 104, FIG. 1) for the communication unit associated with the registration information. Each home GW then determines whether the communication unit can be registered and returns an indication of the success or failure of the registration attempt to the registering ET.

In step 308, the registering ET accumulates results of registration attempts for each of the communication units of the group. When all results are accumulated, or when a response from a home GW is not received within a predetermined period of time, in a preferred embodiment, the ET creates a group registration response message in step 310 which includes the results of the registration attempts for each communication unit. In an alternate embodiment, more than one group registration request message is created. Multiple group registration response messages could be created, for example, when message protocols allow messages only of a certain length.

In step 312, the group registration response message is sent to the VCCU which requested group registration. In an alternate embodiment, results from each registration attempt are sent to the VCCU in individual messages. The method then ends.

For purposes of this description, when a message is transferred along a communication path between a VCCU and a registering ET, the particular transmission medium and number of intermediate nodes which comprise the path are not important to the invention and can be varied depending on the system. For example, a communication path between a VCCU and a registering ET might include an RF link between the VCCU and a satellite, several cross-links between satellites, a down-link to a first ET, and land-line links between the first ET and the registering ET. A different communication path might include an RF link between a VCCU and a first ET, and one or more bent-pipe satellite connections between the first ET and the registering ET. Any number of different communication paths could be used.

Figure 4:
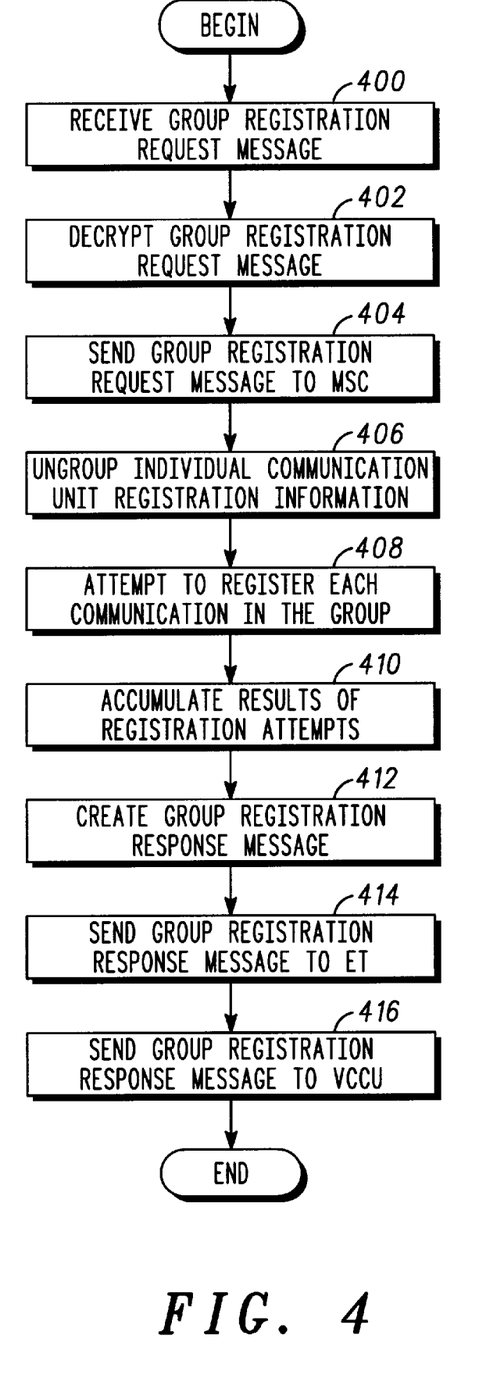
FIG. 4 illustrates a flowchart of a system registration method for a group of co-located mobile communication units in accordance with an alternate embodiment of the present invention.

FIG. 4 illustrates a flowchart of a system registration method for a group of co-located mobile communication units in accordance with an alternate embodiment of the present invention. The method is performed by an ET (e.g., ET 102, FIG. 1) in conjunction with a GW (e.g., GW 104, FIG. 1). The method begins at step 400 when the ET receives a group registration request message which was sent by a VCCU. In step 402, in a preferred embodiment, the ET decrypts the group registration request message. In an alternate embodiment, where the group registration request message is not encrypted, step 402 is not performed. In another alternate embodiment, step 402 is performed later (e.g., by the GW). In step 404, the ET sends the group registration request message to a GW.

In step 406, the GW ungroups the group registration request message to obtain individual registration information for each communication unit of the group. The GW then attempts to register each communication unit of the group in step 408.

In step 410, the GW accumulates results of registration attempts for each of the communication units of the group. When all results are accumulated, in a preferred embodiment, the GW creates a group registration response message in step 412 which include the results of the registration attempts for each communication unit. In an alternate embodiment, the GW creates multiple group registration response messages. In another alternate embodiment, the GW sends the registration results to the ET and the ET creates one or more group registration response messages.

In step 414, the group registration response message is sent to the ET which, in turn, sends the group registration response message to the VCCU in step 416. In an alternate embodiment, results from each registration attempt are sent to the ET and/or VCCU in individual messages. The method then ends.

Figure 5:
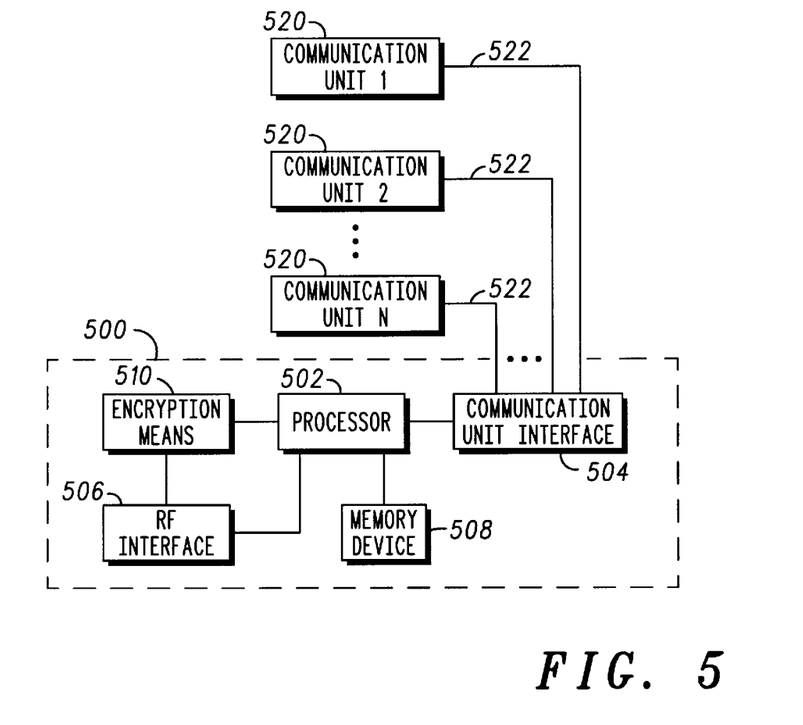
FIG. 5 illustrates a block diagram of a vehicle communication control unit (VCCU) apparatus in accordance with a preferred embodiment of the present invention.

FIG. 5 illustrates a block diagram of VCCU apparatus 500 in accordance with a preferred embodiment of the present invention. VCCU 500 is used to provide communication capabilities for multiple communication units 520, where VCCU 500 and communication units 520 are co-located on a mobile vehicle. In a preferred embodiment, VCCU 500 includes processor 502, communication unit interface 504, RF interface 506, memory device 508, and encryption means 510. In alternate embodiments, VCCU 500 need not include encryption means 510 or memory device 508.

Communication unit interface 504 enables processor 502 to exchange data and messages with communication units 520 over links 522. Links 522 can be hard-wired or RF communication links. Data and messages exchanged between processor 502 and communication units 520 include, but are not limited to, user registration information, registration status information, billing information, and speech/data/fax information.

Processor 502 collects registration information from those users of communication units 520 who might want to use communication resources of VCCU 500 while on-board the mobile vehicle. Processor 502 also creates one or more group registration request messages which contain the registration information from the communication units 520 and sends the group registration request messages via RF interface 506 to the communication system. In a preferred embodiment, the group registration request messages are encrypted by encryption means 510 prior to sending the group registration request messages to the communication system. In an alternate embodiment, messages are not encrypted and encryption means 510 is not necessary.

In a preferred embodiment, processor 502 also receives one or more group registration response messages via RF interface 506 from the communication system. The group registration response messages include information which indicates which of the multiple communication units 520 were successfully or unsuccessfully registered by the communication system. In an alternate embodiment, processor 502 receives individual registration response messages for each communication unit 520.

Via communication unit interface 504, processor 502 then informs the users of each communication unit 520 which wanted to register whether or not the registration attempt for that communication unit 520 was successful.

Memory device 508 is used to store information which processor 502 requires in order to perform its necessary functions. Memory device 508 can be a random access memory, read only memory, or any other type of storage medium and can be integral with or separate from processor 502. For example, memory device 508 could include a table which maps a user's seat number (or communication unit number) to the user's registration information. Such a table could be used for occasional future registration attempts. For example, when the vehicle travels a pre-defined re-registration distance from the location where the vehicle last registered, VCCU 500 might re-register those previously registered users. Rather than prompting the users for their registration information again, processor 502 could extract each user's registration information from the table in memory device 508. In an alternate embodiment, this feature is not provided and memory device 508 might not be required.

As described previously, VCCU 500 sends registration information directly or indirectly to an ET (e.g., ET 102, FIG. 1). In conjunction with a GW (e.g., GW 104, FIG. 1), the ET attempts to register each user whose registration information is contained within a group registration request message.

Figure 6:
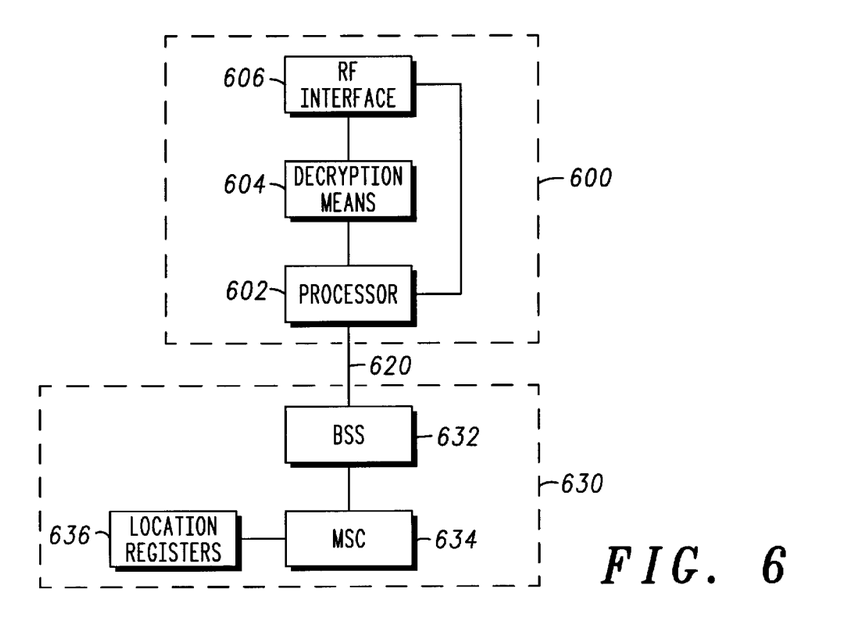
FIG. 6 illustrates a block diagram of an Earth Terminal (ET) apparatus and a Gateway (GW) apparatus which support registration of co-located mobile communication unit groups in accordance with a preferred embodiment of the present invention.

FIG. 6 illustrates a block diagram of ET apparatus 600 and GW apparatus 630 which support registration of co-located mobile communication unit groups in accordance with a preferred embodiment of the present invention. In a preferred embodiment, ET apparatus 600 includes processor 602, decryption means 604, and RF interface 606. In an alternate embodiment, ET apparatus 600 does not include decryption means 604. An ET is also referred to herein as an "RF terminal".

ET apparatus 600 is in communication contact with GW apparatus 630 over link 620. Link 620 can be a hard-wired or RF link which could include one or more intermediate relay nodes (e.g., RF repeaters such as satellites). ET communicates either directly or indirectly with a VCCU (e.g., VCCU 500, FIG. 5) via RF interface 606.

GW apparatus 630 includes Base Station Subsystem 632 (BSS), Mobile Switching Center 634 (MSC), and location registers 636. BSS 632 provides and manages transmission paths between communication units and MSC 634. A GW is also referred to herein as a "registration facility". MSC 634 is a point where user authentication is performed and where communications transit between the system and another network (e.g., a PSTN or other communication network). To determine whether a communication unit is allowed to use the system's services, registration information identifying the communication unit is sent from BSS 632 to MSC 634. After receiving the registration information, MSC 634 performs an authentication procedure to determine whether the communication unit is authorized to use the system. For a communication unit in roaming mode, MSC 634 also determines whether the system and the communication unit's home system have an agreement in place which ensures that the system will receive compensation for service it provides to the communication unit.

In a preferred embodiment, location registers 636 are coupled to MSC 634. Location registers 636 are typically one or more memory storage devices which contain the last known locations of communication units registered with the system. The location information describes the last-known location of the mobile vehicle. The location information can be received as part of the registration information or in a message from the communication system.

Although BSS 632 and MSC 634 are names of devices familiar to those of skill in the art, the functions of the BSS 632 and MSC 634 for the purposes of this description are explained herein. Limitations associated with the use of these names in other contexts are not intended to limit the scope of the present invention.

In a preferred embodiment, ET 600 receives one or more group registration request messages from a VCCU (e.g., VCCU 500, FIG. 5) via RF interface 606. RF interface 606 sends the messages to processor 602. In a preferred embodiment, where the group registration request message is received in an encrypted form, decryption means 604 decrypts the group registration request messages prior to sending the messages to processor 602. Processor 602 ungroups the group registration request message to obtain individual registration information for each communication unit of the group. Processor 602 then attempts to register each communication unit of the group individually by sending the individual registration information to GW 630. In a preferred embodiment, GW 630 is the home GW for the communication unit associated with the registration information. GW 630 returns an indication of the success or failure of the registration attempt to processor 602. Processor 602 accumulates results of registration attempts for each of the communication units of the group. When all results are accumulated, or when a response from home GW is not received within a pre-determined period of time, processor 602 creates one or more group registration responses which include the results of the registration attempts for each communication unit. Via RF interface 606, processor 602 then sends the group registration response message to the VCCU which requested registration. In an alternate embodiment, processor 602 sends results from each registration attempt to the VCCU in individual messages.

In an alternate embodiment, ET 600 receives one or more group registration request messages from a VCCU (e.g., VCCU 500, FIG. 5) via RF interface 606. RF interface 606 sends the messages to processor 602. In an alternate embodiment GW 630 decrypts the messages. Where the group registration request messages are encrypted, decryption means 604 decrypts the messages prior to sending them to processor 602. Processor 602 or decryption means 604, in turn, sends the messages to BSS 632 over link 620. BSS 632 or MSC 634 then ungroups the group registration request messages to obtain individual registration information for each communication unit of the group. MSC 634 then determines whether the each communication unit can be registered. BSS 632 or MSC 634 accumulates results of registration attempts for each of the communication units of the group. When all results are accumulated, BSS 632 or MSC 634 creates one or more group registration responses which include the results of the registration attempts. BSS 632 sends the group registration responses to ET 600 which, in turn, sends the group registration responses to the VCCU. In an alternate embodiment, results from each registration attempt are sent to ET 600 and/or VCCU in individual messages.

In summary, by grouping registration information for multiple communication units into one or more group registration request messages, the method and apparatus of the present invention enables simple registration of co-located mobile user groups and reduces the amount of non-revenue bearing traffic during the registration. These advantages are further realized when registration results are also grouped into one or more group registration result messages.

While the principles of the invention have been described above in connection with specific apparatus, it is to be clearly understood that this description is made only by way of example and not as a limitation on the scope of the invention.

What is claimed is:

1. A method for registering a group of communication units with a radio frequency (RF) communication system, wherein the group of the communication units are co-located on a mobile vehicle, the method comprising the steps of:

a) collecting, by a control unit co-located with the mobile vehicle, individual registration information from each of the communication units of the group;

b) creating, by the control unit, at least one group registration request message which comprises the individual registration information from the communication units of the group; and c) sending, by the control unit, the at least one group registration request message to the RF communication system over a path between the mobile vehicle and an antenna of the RF communication system so that the RF communication system can register the communication units of the group.

2. The method as claimed in claim 1, further comprising the step of:

d) receiving at least one group registration response message from the RF communication system which indicates a registration status for each of the communication units of the group.

3. The method as claimed in claim 2, further comprising the steps of:

e) determining, from the registration status, which of the communication units of the group were successfully registered with the RF communication system; and f) informing those of the communication units of the group which were successfully registered with the RF communication system that registration was successful.

4. The method as claimed in claim 2, further comprising the steps of:

e) determining, from the registration status, which of the communication units of the group were not successfully registered with the RF communication system; and f) informing those of the communication units of the group which were not successfully registered with the RF communication system that registration was unsuccessful.

5. The method as claimed in claim 1, further comprising the step of:

d) encrypting the at least one group registration request message prior to performing the step of sending the at least one group registration request message to the RF communication system.

6. The method as claimed in claim 1, wherein the RF communication system comprises at least one satellite, and wherein the path between the mobile vehicle and the antenna comprises an RF link between the mobile vehicle and a satellite of the at least one satellite.

7. A method for a radio frequency (RF) communication system to register a group of communication units, wherein the group of the communication units are co-located on a mobile vehicle, the method comprising the steps of:

a) receiving, from the mobile vehicle, at least one group registration request message which comprises individual registration information from each of the communication units of the group;

b) ungrouping the at least one group registration request message to obtain the individual registration information for each of the communication units of the group; and c) making individual registration attempts for each of the communication units of the group using the individual registration information.

8. The method as claimed in claim 7, further comprising the steps of:
   d) accumulating registration results for each of the individual registration attempts;
   e) creating at least one group registration response message which comprises the registration results; and
   f) sending the at least one group registration response message to the mobile vehicle.

9. The method as claimed in claim 7, wherein the at least one group registration request message is received in an encrypted form, the method further comprising the step of:
   d) decrypting the at least one group registration request message prior to performing the step of making the individual registration attempts.

10. A control unit co-located with a mobile vehicle, the control unit for communicating with a radio frequency (RF) communication system so that a group of communication units also co-located with the mobile vehicle can be registered with the RF communication system, the control unit comprising:
    a processor for collecting individual registration information from each of the communication units of the group, creating at least one group registration request message which comprises the individual registration information, and sending the at least one group registration request message to an RF interface coupled to the processor,
    a communication unit interface coupled to the processor for interfacing between the processor and the group of communication units; and
    the RF interface coupled to the processor for transmitting the at least one group registration request message to the RF communication system over a path between the RF interface and an antenna of the RF communication system so that the RF communication system can attempt to register each of the communication units of the group.

11. The control unit as claimed in claim 10, further comprising:
    a means for encrypting data coupled between the processor and the RF interface, the means for encrypting for encrypting the at least one group registration request message prior to the RF interface transmitting the at least one group registration request message.

12. A radio frequency (RF) terminal for use in an RF communication system, the RF terminal comprising:
    a processor for receiving at least one group registration request message from an RF interface coupled to the processor, wherein the at least one group registration request message comprises individual registration information from multiple communication units which are co-located with a mobile vehicle and the at least one group registration request message was generated by a control unit also co-located with the mobile vehicle, the processor further for ungrouping the at least one group registration request message to obtain the individual registration information for each of the multiple communication units, and for making individual registration attempts for each of the multiple communication units using the individual registration information; and
    the RF interface coupled to the processor for receiving the at least one group registration request message over a communication path between the RF terminal and the mobile vehicle and for sending the at least one group registration request message to the processor.

13. The RF terminal as claimed in claim 12, wherein the processor is further for accumulating results of the individual registration attempts for each of the multiple communication units, for creating at least one group registration response message which comprises the results, and for sending the at least one group registration response message, using the RF interface, to the control unit co-located with the mobile vehicle.

14. The RF terminal as claimed in claim 12, further comprising:
    a decrypting means coupled between the processor and the RF interface, the decrypting means for decrypting the at least one group registration request message when the at least one group registration request message has been previously encrypted by the control unit.

15. A radio frequency (RF) terminal for use in an RF communication system, the RF terminal comprising:
    a processor for receiving at least one group registration request message from an RF interface coupled to the processor, wherein the at least one group registration request message comprises individual registration information from multiple communication units which are co-located with a mobile vehicle and the at least one group registration request message was generated by a control unit also co-located with the mobile vehicle, the processor further for sending the at least one group registration request message to a registration facility that is responsible for registering the multiple communication units; and
    the RF interface coupled to the processor for receiving the at least one group registration request message over a communication path between the RF terminal and the mobile vehicle and for sending the at least one group registration request message to the processor.

16. The RF terminal as claimed in claim 15, wherein the processor is further for receiving at least one group registration response message from the registration facility, wherein the at least one group registration response message includes results of registration attempts for each of the multiple communication units, the processor also for sending the at least one group registration response message, using the RF interface, to the control unit co-located with the mobile vehicle.

17. The RF terminal as claimed in claim 15, wherein the processor is further for receiving results of individual registration attempts for each of the multiple communication units from the registration facility, for creating at least one group registration response message which comprises the results, and for sending the at least one group registration response message, using the RF interface, to the control unit co-located with the mobile vehicle.

18. The RF terminal as claimed in claim 15, further comprising:
    a decrypting means coupled between the processor and the RF interface, the decrypting means for decrypting the at least one group registration request message when the at least one group registration request message has been previously encrypted by the control unit.

19. A registration facility for use in a radio frequency (RF) communication system, the registration facility comprising:
    a processor for receiving at least one group registration request message from an RF terminal which is capable of communicating with a mobile vehicle over a communication path, wherein the at least one group registration request message comprises individual registration information from multiple communication units which are co-located with the mobile vehicle and the at least one group registration request message was generated by a control unit also co-located with the mobile vehicle, the processor further for ungrouping the at least one group registration request message to obtain the individual registration information for each of the multiple communication units, the processor also for making individual registration attempts for each of the multiple communication units using the individual registration information; and a memory device coupled to the processor for storing location information describing a location of the mobile vehicle for each of the multiple communication units.

20. The registration facility as claimed in claim 19, wherein the processor is further for accumulating results of the individual registration attempts for each of the multiple communication units, for creating at least one group registration response message which comprises the results, and for sending the at least one group registration response message, using the RF terminal, to the control unit co-located with the mobile vehicle.

* * * * *